Nov. 1, 1932.      J. R. MILLER      1,885,939
VALVE
Filed June 24, 1930
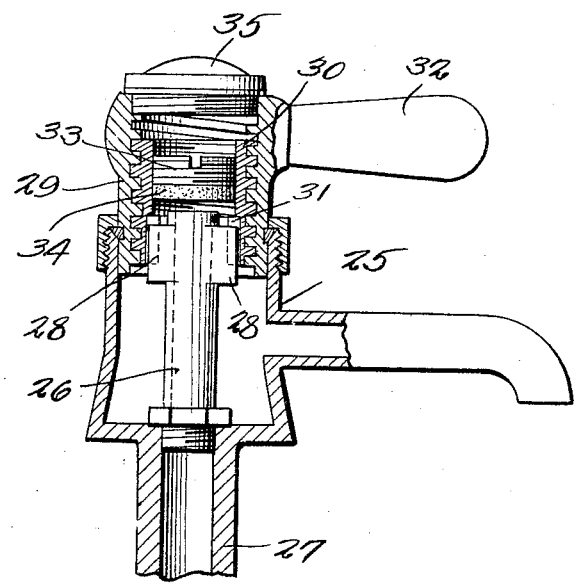
Inventor
J. R. Miller
By C. A. Snow & Co.
Attorneys.

Patented Nov. 1, 1932

1,885,939

UNITED STATES PATENT OFFICE

JOHN R. MILLER, OF BALDWIN PARK, CALIFORNIA

VALVE

Application filed June 24, 1930. Serial No. 463,487.

This invention relates to a valve or faucet construction, the primary object of the invention being to provide a faucet so constructed that the washer of the valve of the faucet may be readily and easily removed and replaced without the necessity of removing the valve operating means of the faucet.

A further object of the invention is the provision of a faucet wherein the washer may be removed and replaced with a screw driver, eliminating the necessity of using wrenches.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

The figure of the drawing is a longitudinal sectional view through a faucet.

As shown by the drawing, a faucet is provided, the faucet comprising a body portion 25 within which the pipe 26 is mounted, the pipe 26 extending into the pipe 27 through which liquid flows. At the upper end of the pipe 26 are ribs 28.

The reference character 29 designates the hollow threaded shank of the valve operating means which is formed with internal threads to engage the external threads of the inner tubular member 30 of the valve, the inner tubular member 30 having recesses 31 in which the ribs 28 are positioned, to prevent rotary movement of the tubular member 30, and permit the tubular member 30 to be raised or lowered when the handle 32 of the threaded shank is rotated. Within the tubular member 30 is a threaded plug 33 against which the washer 34 is positioned, the washer 34 being of a construction to engage the discharge end of the pipe 26 to cut off the passage of liquid therethrough.

At the upper end of the threaded shank 29, is a plug 35 which may be readily removed, in order to gain access to the plug 33 to renew the washer.

From the foregoing it will be obvious that due to the construction, the washer of a valve or faucet, may be readily and easily removed and replaced by means of a screw driver, eliminating the necessity of removing the operating means and handle of the valve.

I claim:

1. In a device of the class described, a body portion, a tube extending into the body portion, and having a valve seat at its free end, ribs extending laterally from the tube, an inner exteriorly threaded member having recesses to receive the ribs, a valve washer within the threaded member and adapted to move with the threaded member to engage and disengage the valve seat and control the passage of liquid through the valve body, and a rotary and non-reciprocable member operating over and threadedly engaging the inner threaded member for moving the threaded member and washer vertically.

2. In a device of the class described, a body portion, a tube extending into the body portion and having the valve seat at its upper end, ribs extending laterally from the tube, an inner exteriorly threaded member having recesses to receive the ribs to prevent rotary movement of the threaded member, a washer carried by the threaded member and adapted to engage the valve seat to control the passage of liquid through the tube, a hollow rotary and non-reciprocable shank mounted on and threadedly engaging the threaded member to move the threaded member vertically, and a removable plug on said shank to permit of access to the interior of the device.

In testimony that I claim the foregoing as my own, I have hereto affixed my signature.

JOHN R. MILLER.